United States Patent [19]
Jackson, III

[11] Patent Number: 4,731,821
[45] Date of Patent: Mar. 15, 1988

[54] SINGLE WIRE TELEPHONE INTERCOMMUNICATION SYSTEM

[76] Inventor: Thomas H. Jackson, III, 604 Burnham Rd., Philadelphia, Pa. 19119

[21] Appl. No.: 929,779

[22] Filed: Nov. 13, 1986

[51] Int. Cl.$^4$ .......................... H04M 9/00; H04M 9/08
[52] U.S. Cl. ...................................... 379/172; 379/388
[58] Field of Search .............. 379/388, 172, 173, 180, 379/171

[56] References Cited

U.S. PATENT DOCUMENTS 4,459,434  7/1984  Benning et al. ................... 379/160

Primary Examiner—Stafford D. Schreyer
Attorney, Agent, or Firm—Clay Holland, Jr.

[57] ABSTRACT

A residential digital logic circuit telephone system is provided for internal voice communications and digital interfaces control which enables two or more conventional twelve button touch-tone telephone devices to be used as a voice intercommunication system utilizing a single bidirectional conductor and for selectively actuating and controlling the operation of other electrical and electronic devices connected to the system from multiple remote locations. In a preferred embodiment of the system, two to five touch-tone telephones inside a residence may be actuated selectively by means of a ringing signal from any one of said telephones to another or all the other telephones by means of a single conductor bidirectional voice communication circuit arrangement which has been established between a calling telephone and a responding telephone. The intercom ringing system is distinct from the normal ringing signal from an incoming outside call. In another embodiment, a two-way communication resident front door speaker device is connected to the intercommunication system so that visitors may be screened before being admitted to the residence by means of an electronic control signal for unlocking the residence door.

11 Claims, 9 Drawing Figures

SINGLE WIRE TELEPHONE INTERCOMMUNICATION SYSTEM

FIELD OF THE INVENTION

This invention relates to an intercommunication system utilized in conjunction with conventional tip and ring telephone systems used in private residences. Prior art intercommunication telephone systems have encompassed various complicated and expensive private branch exchange (PBX) systems and other systems employing elaborate timing (clock) referencing and sequencing techniques.

PRIOR ART TECHNIQUES

In the prior art, for small residence applications, individual instruments for intercommunication and control requirements are used which have wall mounted devices, with the wiring concealed within the walls. Since intercom and control operations are desired from various locations within the residence, the above noted wall mounted devices are costly and restrictive as to installation into existing structures.

Certain prior art devices utilize quad, four wire, telephone conductors for operation of the device. Such devices are disadvantageous in that they utilize the extra two wire (pair) of a local telephone line which are normally not used by the telephone unless some difficulty is encountered with the conventional tip and ring pair. A system of this type is disclosed in U.S. Pat. No. 4,538,031, entitled HOME COMMUNICATION AND CONTROL SYSTEM, issued Aug. 27, 1985 to Gordon D. Banning, et al.

Other systems having intercom, hold, remote control, etc. features are also known, however, such systems are viewed as complex, expensive and impractical for ease of installation while using only two of the incoming local telephone tip and ring pair of conductors. Such prior art systems are disclosed in U.S. Pat. No. 4,097,690, entitled INTERCOMMUNICATION AND ALARM TELEPHONE SYSTEM, issued June 27, 1978 to Donald L. Kuntz, et al; U.S. Pat. No. 4,540,851, entitled REMOTE CONTROL DEVICE USING TELEPHONE CIRCUIT OF ELECTRIC APPARATUS, issued Sep. 10, 1985, to Kazuo Hashimoto; and U.S. Pat. No. 4,100,375, entitled TELEPHONE, INTERCOM AND REMOTE CONTROL SYSTEM, issued July 11, 1978, to David Lewis Noller.

Therefore, it can be readily seen from the prior art that there is a need for a versatile and convenient telephone system compatible with and adaptable to existing two wire tip and ring telephone wiring systems. The present invention offers the desired features for a residence intercommunication system while being compatible for use with outside incoming and outgoing calls. It is also a system which is readily adaptable to existing facilities as well as new constructions and utilizes only two of the four incoming local telephone wires.

SUMMARY OF THE INVENTION

The present invention obviates the shortcomings of the prior art systems by providing a voice intercommunication system which is adaptable for use with existing two-wire telephone wiring found in existing residences and with new conventional two wire, tip and ring, telephone systems. In accordance with the preferred embodiment of the present invention a self-contained semiconductor or digital logic system is utilized which is connected only to the incoming tip and ring pair from the local telephone company. The system encompasses the use of at least two, but preferably more outputs to which multiple, twelve button touch-tone, telephones are connected utilizing the existing or future two wire, tip and ring, telephone system.

In accordance with the present invention the intercommunication system is a self-contained unit of interdependent digital logic circuits and an appropriate power supply with five voltage output tap levels and a ground tap. The system has input terminal provisions for power supply line, tip and ring input connections, at least two connections for twelve button touch-tone telephones and a connection for attaching a front door intercom speaker device. Within the system enclosure, each of the telephone station connections is connected to an arrangement of digital logic circuits, which are conventionally referred to as a family of (CMOS) digital logic circuits. The CMOS family of circuits are basically made up of various combinations of six logic circuits or gates, i.e. AND, NAND, OR, NOR, EXCULSIVE OR and EXCLUSIVE NOR gates. These gating devices along with various switching relays, diodes, transistors, capacitors, resistors and other electronic components constitute the elements of this low voltage power system that may be readily interposed between the two wire pair, tip and ring, of the four wires incoming from the local telephone central office. In addition, the redundant two wire pair for the telephone company's use, is not used by the system in accordance with the present invention.

The logic circuitry in accordance with the present invention provides intercom of certain signals and two way conversation features to be conducted uniquely along a single conductor within the system.

It is an object of the invention to provide an improved intercommunication or intercom system which is readily adaptable for use with the tip and ring wire pair of the conventional incoming residential telephone line only.

Another object of the invention is to provide an improved intercom system which is readily adaptable with existing or future residential telephone wiring.

A further object of the invention is the provision of an intercom system between a plurality of telephone which is of predominately digital logic circuitry.

Still another object of the invention is the provision of an intercom and control system between a plurality of telephones and other voice communication devices such as front door speakers.

Yet another object of the invention is the provision of a hold feature for the intercom system.

Still a further object of the invention is the provision of a disable feature for the intercom system so as to place the residence telephone system in private voice communication operational mode, such as electronic communication with a bank, a secretarial service and the like.

BRIEF DESCRIPTION OF THE DRAWINGS

Referring now to the drawing there is shown in FIG. 1., a block diagram illustrating the intercom system with two telephone stations and a front door speaker station.

FIG. 2 consists of drawings 2A through 2F.

DESCRIPTION OF REPRESENTATIVE EMBODIMENTS OF THE INVENTION

Figure 1:
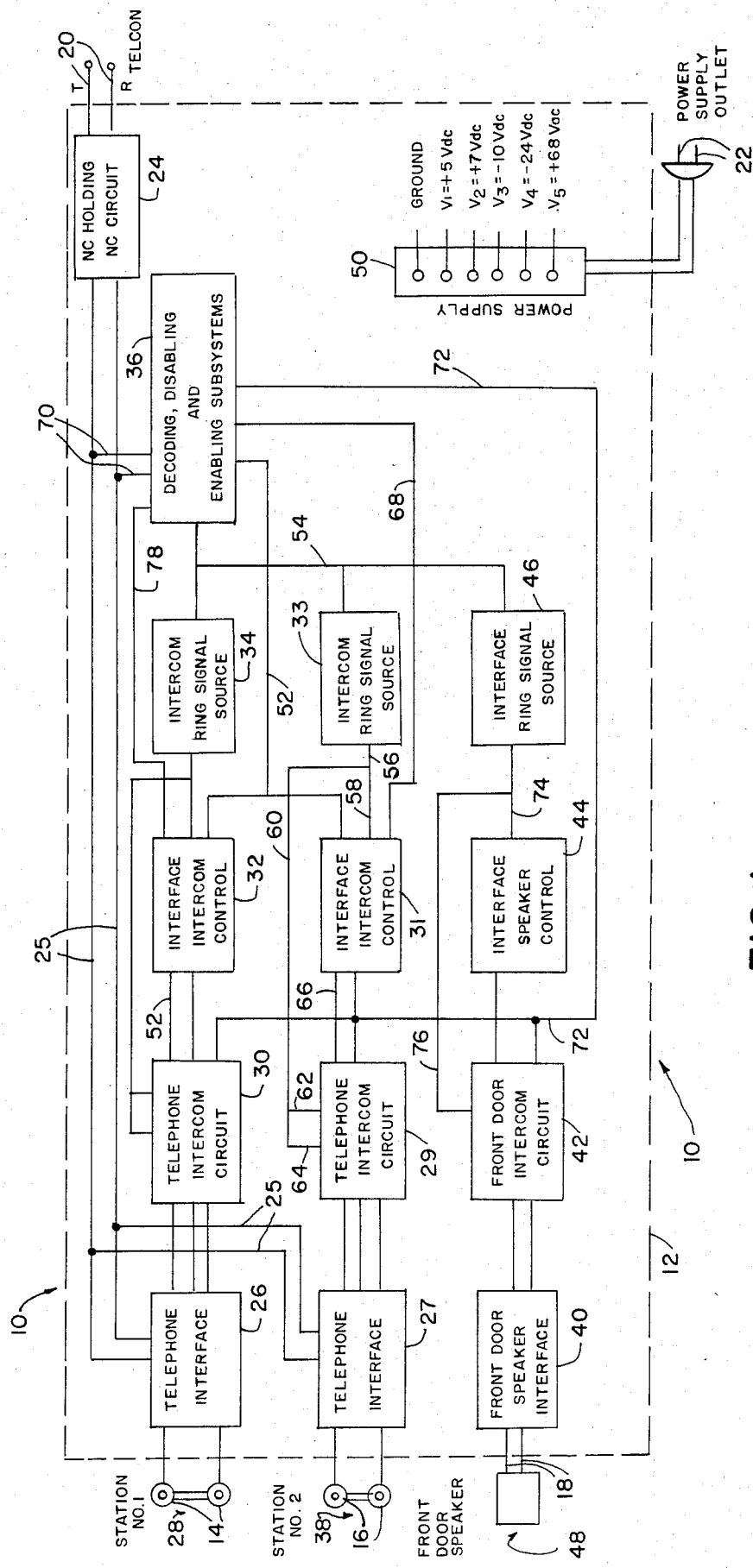
Figure 2A:
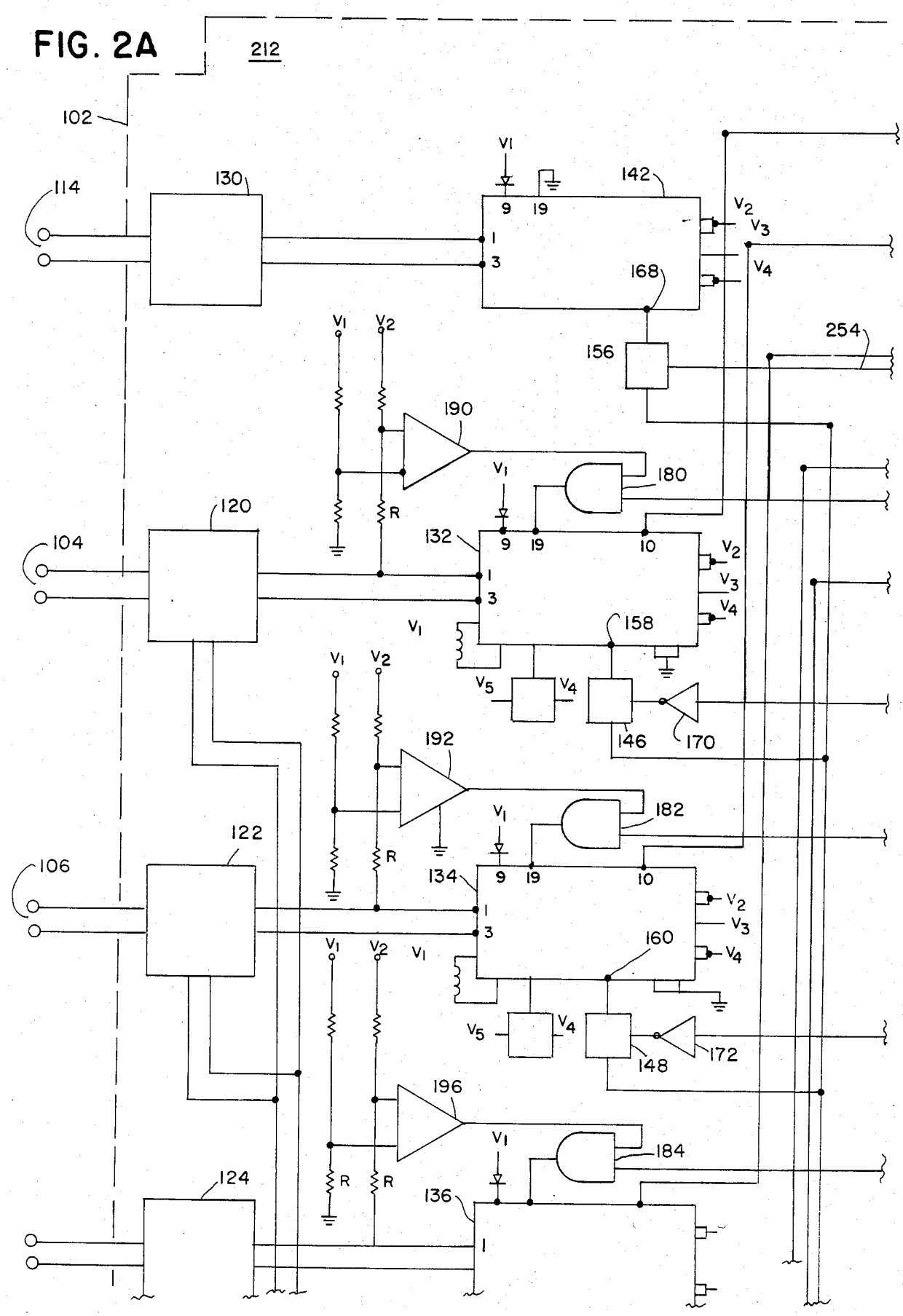
In FIG. 2 there is shown a detailed schematic drawing of the intercom system in accordance with the present invention wherein a variety of CMOS digital logic circuits are utilized.
Figure 2B:
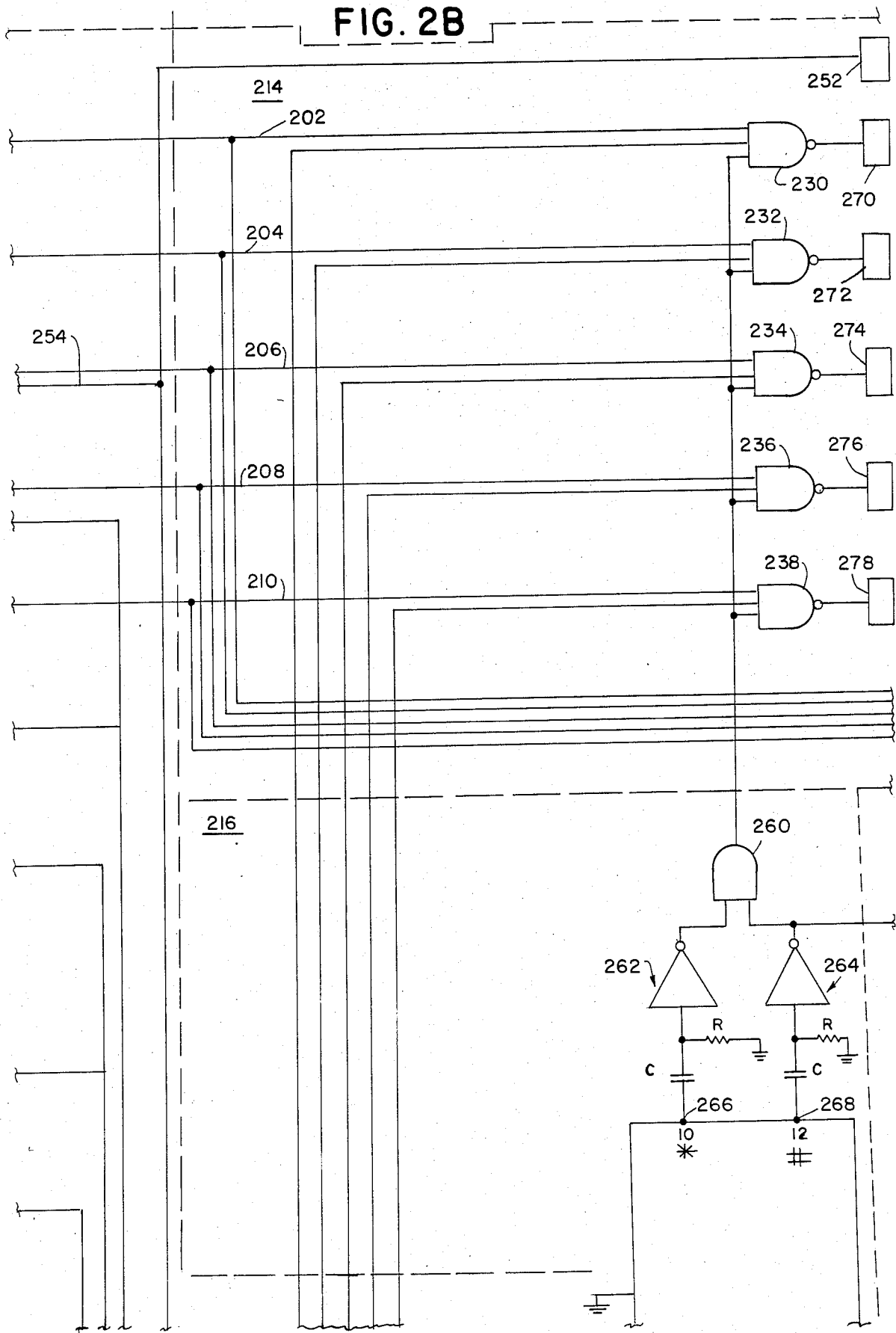
Figure 2C:
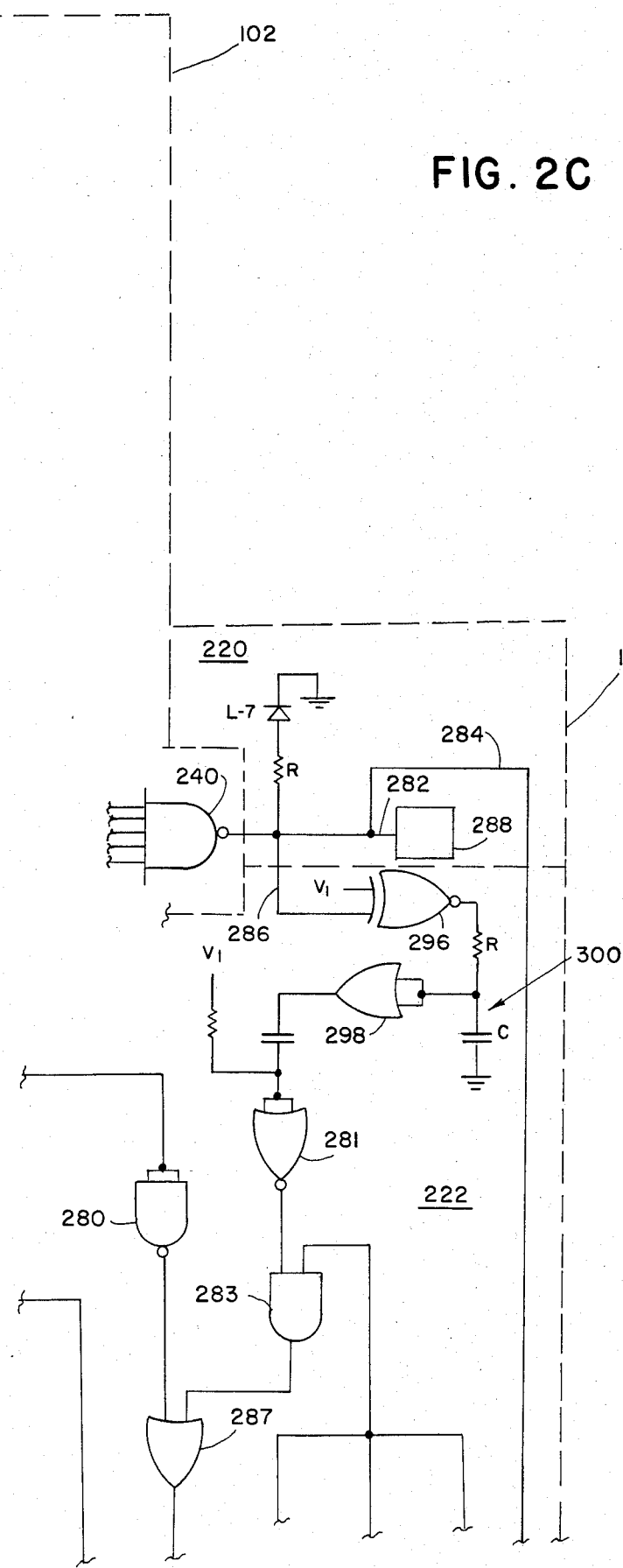
Figure 2D:
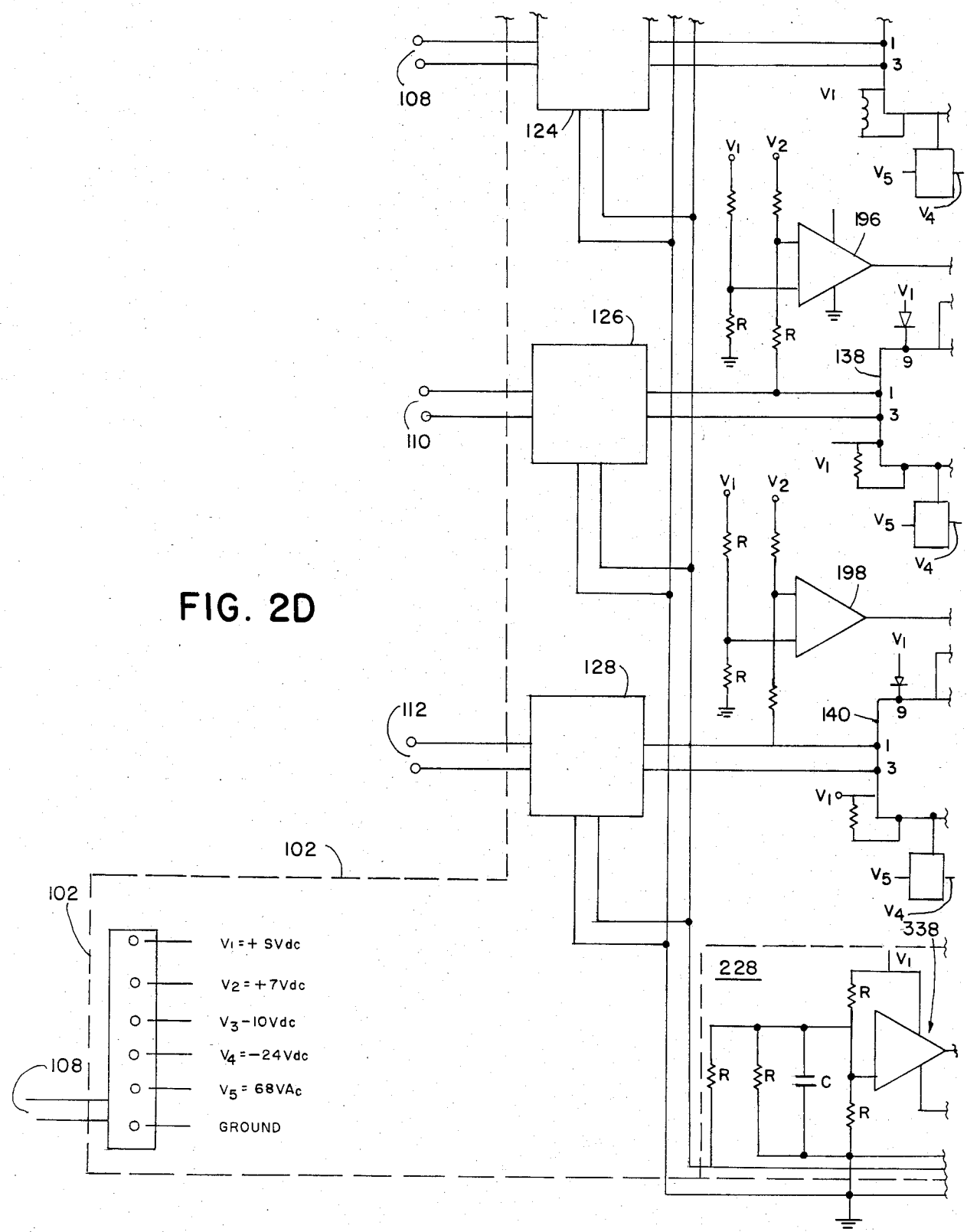
Figure 2E:
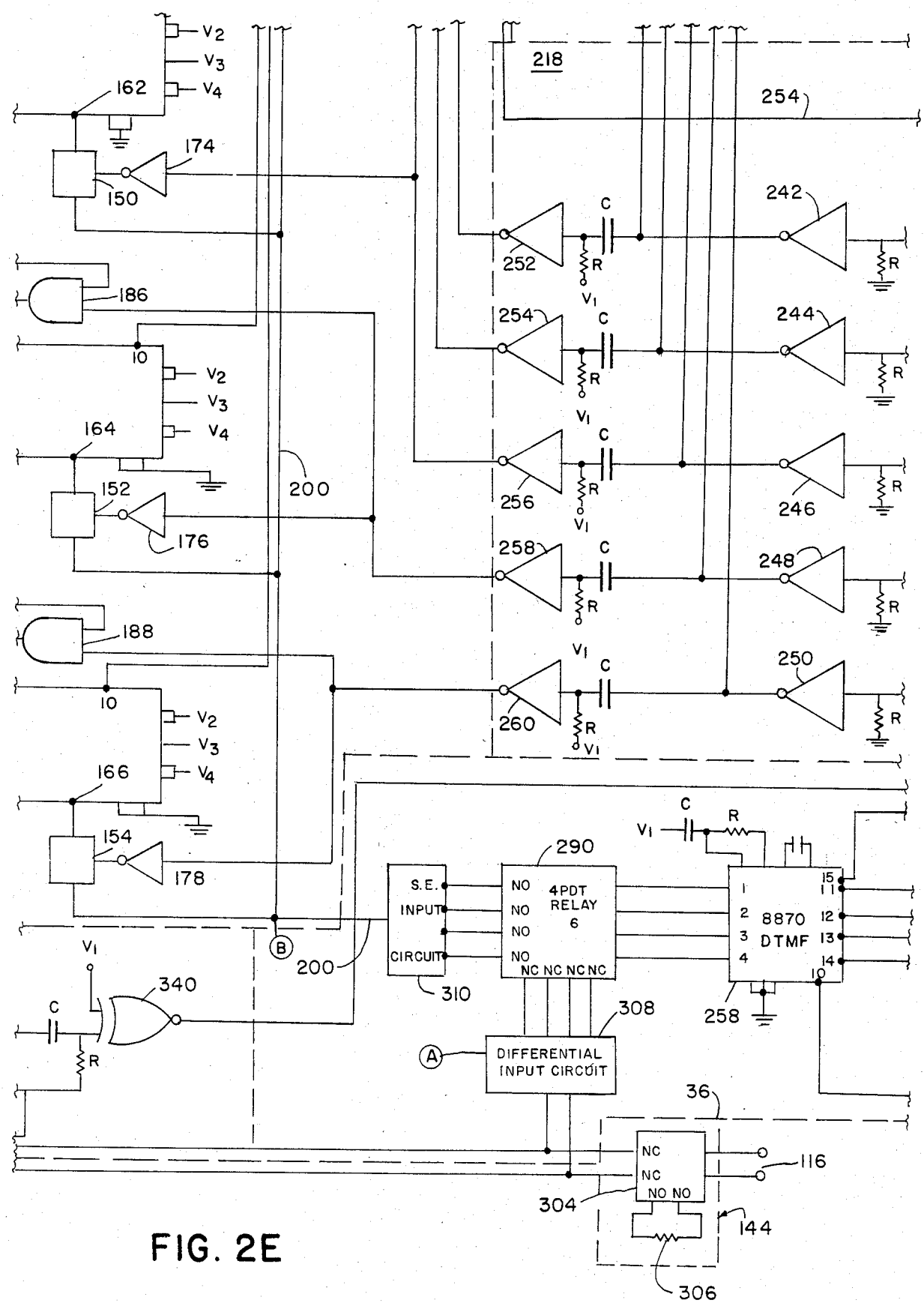
Figure 2F:
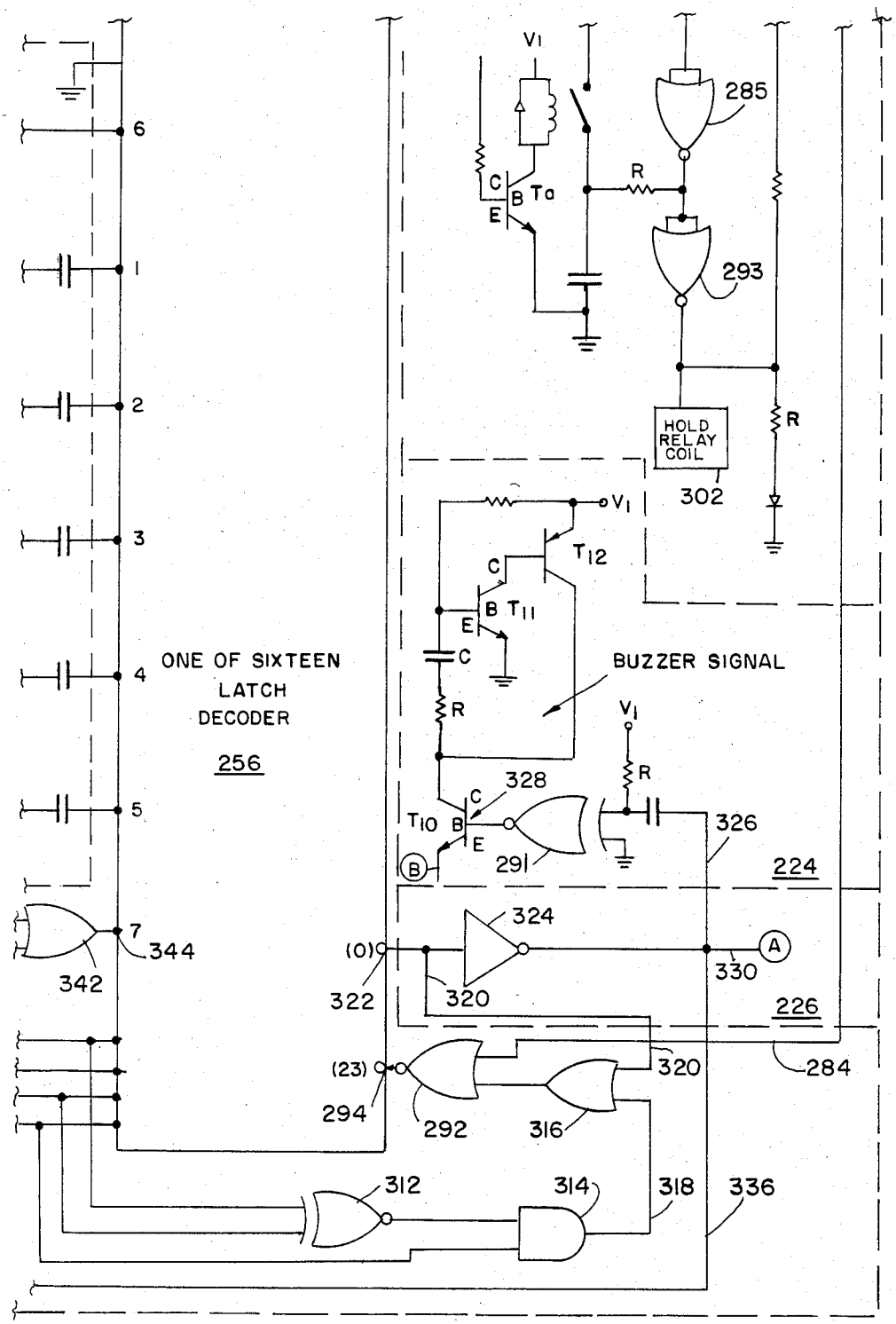

As shown in FIG. 1, telephone intercommunication (intercom) system 10 including the holding and disabling feature are enclosed by broken lines 12. Extending from intercom system 10 are two telephone connection terminals 14 and 16, a pair of front door speak terminals 18, a pair of terminals for incoming telephone company lines 20 and power supply terminal connections 22.

Incoming lines from the local central office (Telco) are connected to terminals 20 which are connected to a holding circuit 24. The incoming two wire telephone line, tip and ring, passes through the normally closed terminals of a relay in holding circuit 24 and are connected to a first telephone station interface 26 through tip and ring lines 25. In a normally closed position interface 26 permits a first station twelve button touch-tone telephone 28 to be connected to the incoming tip and ring wire pair 25 as if interface 26 was not present. Under such condition telephone 28 may be operated in its traditional manner for incoming and outgoing calls. A second station telephone interface 27 is connected to tip and ring lines 25 in a similar manner as interface 26. A second telephone 38 is connected to interface 27 and traditional operation of telephone is possible as in the case of telephone 28.

The telephone interface 26 is shown in a series arrangement with a telephone intercom circuit 30, a intercom control circuit 32, a ring signal source 34, and decoding and disabling systems 36. In a similar manner the second interface 27 shown connected in series with a second intercom circuit 29, a second interface intercom circuit 31, a second intercom ring signal source 33 and to decoding and disabling systems 36. In a somewhat similar manner a front door speaker 48 is connected to a front door speaker interface 40 shown in series with a front door intercom circuit 42, an intercom speaker control 44, an intercom ring signal source 46 and to decoding and disabling systems 36. Power supply 50 is shown with six taps for specific voltage levels and a ground connection and is connected to the system at selected points to provide the required voltages for the systems.

With the connections shown in FIG. 1, operation of the system may be commenced by lifting either the first telephone 28 or the second telephone 38 off its hook. By lifting telephone 28 off-hook and pressing the asterisk or star (*) button, a signal 52 is imposed on interface intercom control circuits 31 and 32, which in turn causes relays in each of telephone interfaces 26 and 27 to be activated (@ ½ sec). When these relays are activated each interface 26 and 27 is disconnected from its respective connection to the tip and ring pair 25, and is switched so as to connect telephones 28 and 38 to their respective intercom circuits 30 and 29. At telephone 28 the two (2) button is depressed, designating the desire to establish intercom connection between telephone 28 and 38. A signal 54 is impressed on ring signal source 33 from decoding system 36 responsive to the two (2) button being depressed. Signal source 33 sends a signal 56, which splits into signals 58 and 60. Signal 58 goes to interface intercom control 31, and signal 60 goes to intercom circuit 29 at two input points 62 and 64 respectively. Divided input signal 60 to circuit 29 is a ring signal 62 at telephone 38 and the other is an intercom actuating signal 64. The signal 58 to control 31 is a second control signal for sealing telephone 28 in the intercom mode. A final control signal 66 is sent to seal station two into the intercom and occurs when telephone 38 is lifted off-hook, which causes third and final signal 66 to be imposed on interface intercom control circuit 31. Off-hook signal 66 to interface control 31 causes a signal 68 to actuate a relay in decoding system 36 to thereby disconnect decoding system 36 from tip and ring pair 25 through connections 70 while connecting decoding system 36 to circuits 30, 29 and 42 through a conductor 72. Conductor 72 is a single wire bidirectional or two way transmission conductor essential for the intercom system enabling voice signals to be communicated between the two telephones 28 and 38, or telephone 28 and speaker 48 or telephone 38 and speaker 48.

The foregoing brief description of system operation relates to the operational procedures needed to complete an intercom connection between two telephones in a system. A similar process is followed to have intercom connections between more than two telephones and will be more fully understood in connection with a description of FIG. 2 hereinbelow.

Continuing with the description of FIG. 1, with respect to front door speaker 48, the system's operation is initiated in response to a person activating a front door speaker device 48 of a residence. In response to activating the front door device either one of telephones 28 or 38 is lifted off-hook and the star (*) button on the telephone is depressed which commences the intercom connection process as described hereinabove. Next the number 6 button, which has been designated the front door intercom button in the present design, is depressed. A signal along conductor 54 is sent to intercom ring signal source 46. An output signal from source 46 splits into signals 74 and 76. Signal 74 goes to interface speaker control 44 and causes a relay associated with front door speaker interface 40 to be connected to speaker 48 and intercom circuit 42 through front door speaker interface 40.

Signal 76 is applied to intercom circuit 42 and is one of two signals needed to connect the speaker to the intercom system. The second signal needed to complete the connection is derived through conductor 72. As discussed hereinabove, when telephone 28 is lifted off-hook, a signal 78 is generated which activates a relay of decoder 36 which causes decoder 36 to be connected to circuit 42, 29 and 30 via conductor 72. Connection of conductor 72 to circuit 42 along with the signal from conductor 76 completes the connection of the front door speaker 48 to the intercom system along with telephone 28 so that two way speech transmission is possible.

The disabling and holding features of the present invention will be described in connection with the discussion of FIGS. 2A through 2F.

As seen in FIGS. 2A-2F, an intercommunication (intercom) system 100 with hold, disable and enable features of the present invention are defined by broken lines 102. Also shown are a series of telephone station connection terminals 104–112, a front door device terminal 114, a pair of terminals 116 as the tip and ring line pair to receive and transmit signals for incoming and outgoing calls and terminals 118 for the power supply connection. Within the area defined by broken lines 102 are a plurality of interface relay circuit devices 120–130 connected respectively at one end to telephone terminals 104–112. These relay circuits are used to isolate intercom usages from normal telephone usage, and assists the intercom system to be transparent to the central office, (Telco).

Each interface relay circuit 120–130 is respectively connected at their normally open terminals to a corresponding plurality of subscriber line interface circuits 132–142. These subscriber line interface circuits (SLIC chips) are CMOS integrated logic circuits designed to interface with voice communications devices within the system. Interface relay circuits 120–128 are connected in parallel at their normally closed position terminals to the normally closed terminals of a hold relay circuit 144 which is in turn connected to incoming and outgoing telephone, tip and ring line pair, terminals 116. These connections enable telephones connected to terminal stations 104 through 112 to be connected for normal incoming and outgoing telephone operation when the intercom, hold or disable features of the system are inoperative.

Each of the SLIC chips 132–142 has a bilateral switch circuit 146–156 connected to one of the terminals 158–168 and each bilateral switch circuit respectively of such bilateral switches 146–154 has a corresponding inverter circuit 170–178 respectively connected to each circuit. These inverters provide one of the signals necessary for switching the bilateral switches for intercom operation. Also connected respectively to each SLIC chips 132–140 is a plurality of AND gates 180–188. These AND gates provide the respective ring signals to terminal stations 104–112. Also connected to AND gates 180–188 respectively is a plurality of operational amplifier circuits 190–198 which function to detect the on-hook or off-hook state of an intercom connected telephone. These voltage comparator networks are connected to their respective SLIC chips 132–140 and relay circuit devices 120–128 and feed signals to the AND gates 180–188 along with a second signal to these AND gates to provide a ring signal. Each of the bilateral switches 146–156 is also connected to a main common intercom conductor which is uniquely operable as a bidirection single wire voice communication conductor of the system when the system is in either the intercom or hold mode of operation. In order to provide an off-hook signal for a selected telephone station an output connection is made respectively to each SLIC chips 132–140 via terminals 202–210 of these chips.

In the circuitry described thus far, circuit references 120–142 and 146–210, excluding hold circuit 144 have been shown in FIGS. 2A–2D within that section of broken lines 102 and designated 212. The system has been divided into eight addition sections or subsystems to facilitate further detailed description of FIGS. 2A–2F. These are Interface Intercom Control and Sub-System 214 Decoding Sub-System 216, Ring Signal Sources Circuit subsystem 218, Four Signal Sources circuit subsystem 220, Hold Circuit subsystem 222, Buzzer Signal circuit 224, Disable circuit sub-system 226 and Re-enable Circuit Subsystem 228. Each of these subsystem circuits provides novel features which are integrated and interdependent upon the other in a unique and unobvious manner to provide the functional and operational features of the entire system in accordance with the present invention.

Referring to Interface Intercom Control sub-system 214, a plurality of input signal connections from each SLIC chip 132–140 is made to a corresponding plurality of three input NAND gates 230–238, of control subsystem 214 on one terminal of said gates. In addition, a connection from each SLIC chip 132–140 is made to a single five input NAND gate 240. A second input connection to NAND Gates 230–238 is made from Ring Signal Source subsystem 218 from output terminals of a plurality of signal inverters respectively 242–250. The output of inverters 242–250 are also connected respectively to another plurality of inverters 252–260, whose outputs are respectively connected to inverters 170–178 and AND Gates 180–188. The input terminals of inverters 242–250 are connected to Decoding subsystem 216 which initiates ring signal through subsystem 218 in response to depressions of telephone buttons 1–5 at the five respective telephone stations 104–112. There is a connection between Decoder subsystem 216 and a relay coil 252 of subsystem 214 via conductor 254 which activates front door Relay 130 whenever a number six button at any telephone station is depressed during intercom operation. Conductor 254 is also connected to bilateral switch 156 for providing the second input signal required of its intercom operational mode.

Referring now to Decoder subsystem 216, which includes a one of sixteen decoder CMOS integrated circuit 256, having a latch followed by a 1-of-16 decoder responsive to a 4-digit input code from a Dual Tone Multi-frequency (DTMF) Decoder 258 which is connected directly thereto. Decoder 256 has 16 output terminals but only 9 are used in the present system being described. A two input AND gate 260 has two inputs from two half monostable timing circuits 262 and 264, whose inputs are connected to decoder 256 respectively at output terminals 266 for the star (*) button signal and 268 for the pound sign (#) button signal. The output of AND gate 260 is connected to a third terminal respectively of NAND gates 230–238 and the outputs of these respective NAND gates are connected to a plurality of relay coils 270–278 which respectively actuate relay circuit devices 120–128 from their normally closed positions to their normally open positions to thereby connect all telephone stations into the intercom system and disconnecting them from the normal telephone operation when required.

The output terminal of timing circuit 264 is also conected to a three input NAND gate 280 of hold subsystem 222, at a point where the inputs of gate 280 are tied together. By tying the three inputs of NAND gate 280 together the device operates as an inverter circuit.

Referring again to subsystem 214, the output of a five input NAND gate 240 is divided into four paths. This discussion now refers to Subsystem 220. A first path 282 is connected to a relay coil 288 which actuates a relay 290 which causes it to switch from normally closed position to its normally open position, so as to disconnect a differential input circuit 308 and connect a single ended input circuit 310. A second path 284 is connected to the input of a NOR gate 292 whose output is connected to decoder 256 at an input terminal 294 providing an enabling signal to decoder 256. A third path 286 is connected to an EXCLUSIVE NOR gate 296 whose output is connected to the input of a two input OR gate 298 whose input terminals are tied for inverter operation via an R-C time delay circuit 300. The fourth path is connected to status LED "L-7". The light display indicates whether the intercom is active or inactive. The output from NAND Gate 280 or OR gate 281 operate to either actuate or deactuate a hold relay coil 302, which in turn actuates or deactuates hold relay 304 of hold circuit 144. When hold relay 304 switches from its normally closed position, transmitting incoming and outgoing calls, to its normally open, tip and ring pair 116 position, the central telephone company is connected in series with an appropriate impedance 306. When impedance 306 is connected across the tip and ring pair 116, telephone stations 104-112 are unable to receive incoming calls or send outgoing calls, since they have been temporarily restricted to the intercom mode of operation. Additionally, provision of an appropriate impedance 306 causes the intercom system to be transparent to Telco so that no disruption of the normal telephone service occurs. It should be noted at this point that when relay 290 switches to its normally open position differential input circuit 308 normally connected thereto was disconnected and single ended input circuit 310 is connected.

Figure 3:
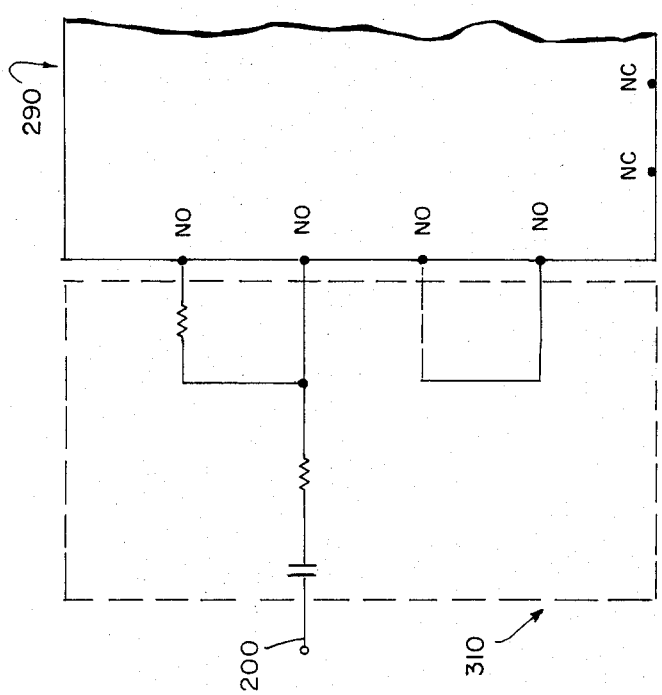
FIG. 3 is the single-ended input circuit shown in FIG. 2.

The intercom loop is essentially completed through a single ended input circuit 310 which is connected to the normally open terminals of relay circuit 290 and to the intercom system through conductor 200. The details of the connection of single ended input circuit 310 are shown in FIG. 3.

In order to complete the enable function of the system with NOR gate 292, three additional gates are needed, namely an EXCLUSIVE NOR gate 312, an AND gate 314 and an OR gate 316. Two of four digital outputs from Decoder 258 are connected to inputs of EXCLUSIVE NOR gate 312 and a third is connected to an input of AND gate 314 along with the output of gate 312 from which a single output signal 318 of gate 314 is connected to an input of OR gate 316 along with an input connection 320 from Decoder 256 via a terminal connection 322 designated zero (0) which is generated when the zero (0) is depressed on any one of the plurality of telephone stations 104-112, while in the intercom mode.

Figure 4:
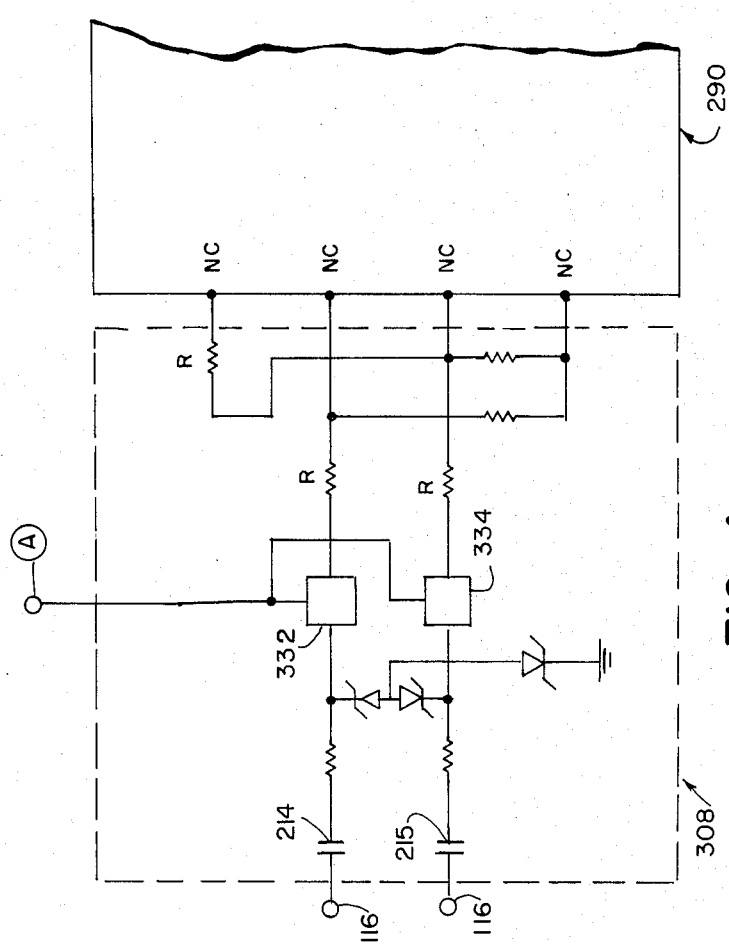
FIG. 4 is the differential input circuit shown in FIG. 2.

The disable function commences at Terminal 322 after the user has lifted the receiver and depresses the star (*) and then depresses the zero (0) button. The output level at Terminal 322 is high and this signal is connected to an inverter circuit 324 of Disable subsystem 226. The output of Inverter 324 splits into three signals. A first output signal 326 is connected to Buzzer Signal circuit 224, to generate a disable audio output buzzer signal at terminal B via a transistor 328 which is connected to intercom conductor 200 at point B. A second signal connection 330 at point A is connected to differential input circuit 308 to thereby disable a pair of bilateral switches 332 and 334 thereof, the details of which are shown in FIG. 4. A third disabling signal connection 336 is connected to decoder 258 disabling it during the disable mode of operation. When the switch hook is depressed and released the operator gets a dial tone and the system has returned to the tip-ring wire pair for sending and receiving calls and the intercom system has been disabled. With the disable function in operation, system 100 may be used to conduct private transactions, such as communicating with a bank to perform bank transactions by telephone in geographical areas where such facilities are available via telephone line hook-ups.

Referring now to FIG. 2, Enable Intercom subsystem 228 is shown which includes an operational amplifier circuit 338 used as a voltage comparator and a series connected EXCLUSIVE NOR gate 340. The input to operational amplifier 338 is connected to tip and ring pair 116. Upon completion of use of the telephone system in the disable mode, the switch-hook is depressed for at least three seconds, upon release of switch hook (off-hook) a high pulse output is generated by subsystem 228. The reference input of the operational amplifier is set at a nominal +2.5 volts dc. The output of EXCLUSIVE NOR gate 340 is connected to one of two inputs of an OR gate 342 whose output is connected to the follow input of latch decoder 256. The high output to OR gate 342 is applied to the follow input of latch decoder 256 which brings output terminal 322 back to a low condition for normal operation.

When all telephones are on hook the input voltage to circuit 338 is +5 volts dc and when any telephone goes off-hook a voltage drop occurs to about +0.8 volts dc, which is a swing around the nominal reference input of +2.5 volts dc. The swing occuring as a result of removing any telephone off-hook causes operational amplifier 338 to change from a high to low output, and replacing the phone causes a swing from low to high.

From the foregoing description of the intercom system it can be readily seen and appreciated by those skilled in the art that the circuitry is relatively uncomplicated and unique in the manner in which the various CMOS logic circuits are integrated to cooperate with one another to provide a single conductor bidirectional self-contained voice communication system having a variety of desirable functional features which may be readily and simply added to existing and future incoming tip and ring wire pair from a local telephone company.

Another embodiment of the present invention is provision of means for connecting other two-way voice communication devices to the intercom system, such as a residence front door speaker device, for example. In this embodiment a pair of terminals are provided so that a two-way speaker device may be connected to the intercom system. When the traditional front door bell is rung any telephone extension connected to the system may be used to answer by lifting the receiver off-hook, activating the intercom mode of operation and depressing the number six (6), which has been preselected to connect the front door speaker. Once the visitor has been identified and the inhouse resident wishes to admit the visitors he may do so by going to the front door and manually opening the door or alternatively the front door may have an automatic lock release connected to the system which is actuated by depressing another telephone button, for example button number seven (7) which has been pre-selected for such functions. This embodiment of the invention may provide a convenient way for incapacitated people to provide entry to visitors without the need to physically go to the front door to open it. Furthermore, this embodiment provides a convenient screening process for visitors while also providing a security feature for small children who may be left alone with instructions to only admit known visitors or other members of the household.

Obviously, the system is capable of being adapted to provide a switching signal for turning on-off a television monitoring device which may be connected to the intercom system, so that the visitor may be viewed while standing near the front door seeking entry.

Several advantages of the system in accordance with the teachings of the present invention include the ability to provide convenient voice intercom between a plurality of telephones from any location within a residence wherever a telephone extension exists. The system also permits two-way intercom voice communication between a speaker connected to the system from any telephone extension.

Another advantage of the system is its hold feature, which enables incoming or outgoing calls to be held and then transferred between the various telephone extensions or to be shared by more than one telephone extension simultaneously.

Still another advantage of the system is the provision of a feature which temporarily disables the intercom and hold features of the system so that the private transaction feature of the conventional telephone is available for use.

The foregoing advantages of the system may be more clearly understood and appreciated by a brief description thereof in accordance with the teachings of the present invention. Operation of the intercom feature is commenced by lifting the telephone receiver at any telephone extension location, whereupon a dial tone from the local telephone company may be heard transmitted along the tip and ring wire pair. Depression of the star (*) button at any station where receiver has gone off-hook causes a relay for each station to switch from its normally closed position to its normally open position causing all telephone extensions to be connected to an intercom system. Next depression of button 2-5 at station 1 will cause a ring signal at the station selected and connects station 1 to the selected station 2-5 when the receiver is removed off-hook. Multiple rings of the intercom are possible at the selected stations so long as the receiver is on-hook. To release the intercom feature of the system, simply depress the off-hook button for at least three seconds.

Operation of the hold feature is commenced by lifting the receiver off-hook for receiving an incoming call and depressing the 1b. (#) button of the telephone device. Depressing the # button causes the user's telephone to be connected to the intercom system and causes the tip and ring pair to be connected to an impedance. To transfer an incoming call from one telephone station to another, the user depresses the # button and then depresses the identification number of the other telephone station. At this point both stations are connected to the intercom while the incoming call is connected to impedence 306. Once the receiver of the initial telephone is replaced on-hook, the transfer/receiving station must have its off-hook button depressed for about one second to be reconnected to the tip and ring pair when relay coil 302 is deactivated causing relay 304 to return to its normally closed position. When relay 304 returns to its normally closed position the telephone station is reconnected to tip and ring pair 116 and the awaiting call has been transferred.

Operation of the disable feature is commenced by lifting a telephone receiver off-hook at any one of the telephone stations, depressing the star (*) button which connects the user telephone station to the intercom system. Next the zero (0) button at the user station is depressed, which causes the signal at terminal 322 to go from a low to a high signal activating subsystem 226 which in turn activates subsystem 224. The output of subsystem 224 via transistor 328 transmits a buzzer signal to the user station indicating that the disable feature is in operation. Simultaneously, an output signal from subsystem 226, output conductor 330 transmits a disabling signal to differential input circuit 308, and another output conductor 336 transmits a second disabling signal to CMOS Dual-Tone Multi-Frequency decoder circuit 258. Disabling circuits 308 and 258 effectively disconnects intercom system while disabling buttons star (*) and 1b (#) for purposes of intercom or hold features. While the intercom is in this disabled condition the star (*) and 1b. (#) may be used for private bank transactions over the tip and ring wire pair 116 in areas where such services are available.

In order to deactivate the disable feature, the off-hook switch is depressed for at least three seconds. A high output pulse signal is developed via EXCLUSIVE NOR gate 340 which is applied to the follow input 344 via OR gate 342. This causes output terminal 322 to go from a high to low condition, which causes the disabling signals along conductors 330, 326 and 336 to return to normal operations.

In closing, it is useful to briefly review the advantages of the present invention. One such advantage is the provision of a compact, self-contained digital logic circuit system which is readily adaptable to existing and future telephone wiring, i.e. incoming tip and ring pair conductors. Such pair conductors are readily connected to input of the system, while the outputs of the system are a plurality of terminals for telephone extension and audio speaker devices. Another advantage of the system is the provision of intercom, hold and disable features in a system which does not require multiple device installations to provide such features for a residence. Yet another advantage of the system is the provision of intercom or two way verbal communication from a plurality of remote telephone extensions and a remote speaker device, such as a front door speaker, for purposes of convenience and security.

While the present invention has been described with reference to various of the most common and desirable features in an inercom system, it is to be understood that alternatives and modifications may be made in the system, or one or more of the individual subsystems without departing from the spirit and scope of the present invention. Accordingly, it is expressly understood that the scope thereof is to be limited only by the teachings disclosed herein and the appended claims when accorded the broadest interpretation consistent with the basic concepts taught herein.

What is claimed as new is:

1. An improved telephone intercommunication system having a plurality of CMOS digital logic circuits providing two-way voice communication through the use of a single bidirectional conductor within said system, the improvement comprising:
   a. at least two telephone interface circuit devices connected in parallel to a tip and ring conductor pair from a local telephone company for sending and receiving voice messages;
   b. an inline hold circuit device connected in series with said telephone interface circuit devices;
   c. at least two telephone intercommunication circuit devices each connected to said interface circuit devices to receive and send both voice and non-voice signals therebetween;
   d. at least two interface intercommunication control circuit devices for receiving at least three types of input signals and generating at least three control output signals;

e. a plurality ring signal circuits for shaping and transmiting a plurality of ring signals to said telephone, intercommunications circuit devices and said control circuit devices;

f. a digital logic circuit for decoding digital input signals from said telephone intercommunication circuits and outputting coded digital signals;

g. a latch decoder device for receiving a plurality of digital input signals from said digital logic circuit and generating a corresponding plurality of output signals responsive to said digital input; and h. a power supply source having an input and a plurality of voltage outputs for operation of said devices and circuits.

2. The telephone voice intercommunication system defined in claim 1, which is further defined as being connected to the tip and ring pair conductors from the local telephone company and then in series with at least two parallel connected telephone devices used for receiving or sending telephone calls.

3. The telephone voice intercommunication system defined in claim 2, wherein said system is further defined as having a two-way voice speaker device connected to said system, whereby each of said telephone devices may have two-way voice communication between said speaker and said telephones.

4. The telephone voice intercommunication system defined in claim 2, in which said interface circuit device is further defined as a two pole double throw relay for disconnecting a telephone device from said tip and ring conductor pair and reconnecting said telephone device to an intercommunication circuit device.

5. The telephone voice intercommunication system defined in claim 4, in which said intercommunication circuit device is further defined as a subscriber line interface circuit.

6. The telephone voice intercommunication system defined in claim 5, in which said intercommunication circuit device is further defined as consisting of a CMOS integrated circuit, an operational amplifier, an AND gate, a bilateral switch, a ring signal inverter and a relay.

7. The telephone voice intercommunication system defined in claim 6, in which said interface intercommunication control circuit devices are further defined as consisting of a three input NAND gate, a relay and a coil, and a five input NAND gate.

8. The telephone voice intercommunication system defined in claim 7, in which said ring signal circuits are further defined as consisting of a pair of series connected inverter circuits.

9. The telephone voice intercommunication system defined in claim 8, in which said digital logic circuit consists essentially of a CMOS dual tone multifrequency decoder circuit, a four pole double throw relay, a single-ended input circuit and a differential input circuit.

10. The telephone voice intercommunication system defined in claim 9, in which said latch decoder devices consist essentially of a CMOS integrated 1 of 16 latch circuit, a pair of inverters, plurality of OR, AND, NAND, NOR and exclusive NOR gates.

11. The telephone voice intercommunication system defined in claim 2, which is further defined as having a telephone signal hold circuit and a circuit disable device.

* * * * *